Jan. 12, 1943.　　　　C. P. DEIBEL　　　　2,307,763

DRY CELL BATTERY

Filed July 2, 1941

INVENTOR.
CYRIL P. DEIBEL
BY William E. Chilton
ATTORNEYS.

Patented Jan. 12, 1943

2,307,763

UNITED STATES PATENT OFFICE 2,307,763

DRY CELL BATTERY

Cyril P. Deibel, Lakewood, Ohio

Application July 2, 1941, Serial No. 400,774

3 Claims. (Cl. 136—107)

This invention relates generally to a dry cell which is particularly suitable for use with a flashlight and which is also well adapted for use where a leak-proof cell or battery unit is required.

One of the objects of the invention is to provide a dry cell battery which comprises one or more cells enclosed within a casing and sealed therein in such manner as to permit excessive pressure within the cell to be relieved without permitting the liquid contents of the cell to escape and without permitting the ingress of outside air.

Another object of the invention is to provide a dry cell unit which consists essentially of a zinc cup in which is arranged a mass of depolarizing mix, an electrolyte and a carbon electrode, the zinc cup being sealed by an imperforate metal cover which is insulated from the zinc cup but which has electrical contact with the carbon electrode, the zinc cup being enclosed within a metal sheath or casing which holds the imperforate metal cover in place so as to provide means for venting excessive pressure within the cell, the outer metal sheath being insulated from both the zinc cup and the metal cover.

Another object of the invention is to provide a dry cell having the above described distinguishing features and characteristics and which is well adapted for production at comparatively low cost.

Figure 2:
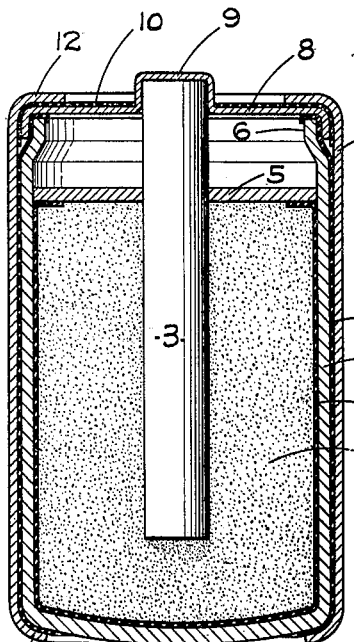
Figure 1:
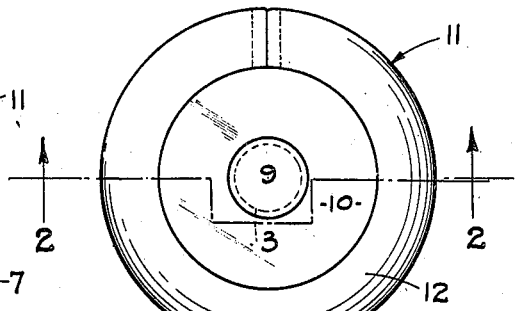
Figure 3:
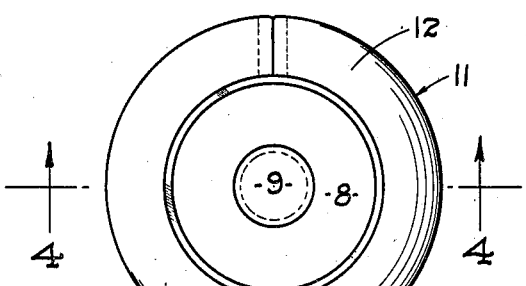
Figure 4:
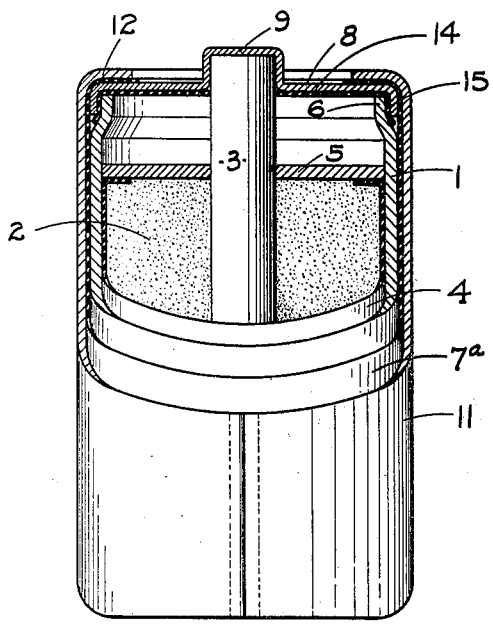
Figure 5:
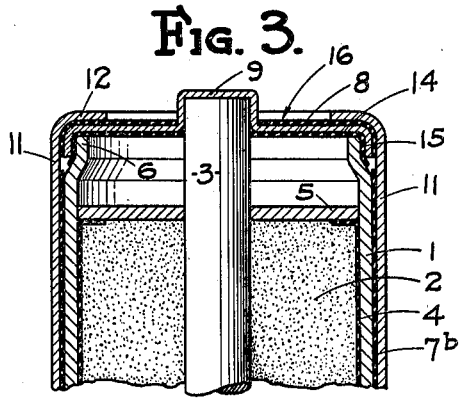

Further and more limited objects of the invention will appear as the description proceeds and by reference to the accompanying drawing in which Fig. 1 is a top plan view of a cell embodying the features of my invention; Fig. 2 is a vertical sectional view on the line 2—2 of Fig. 1; Fig. 3 is a top plan view of a modified form of dry cell also embodying the features of my invention; Fig. 4 is a view partly in section and partly in elevation, the section being taken on the line 4—4 of Fig. 3; and Fig. 5 is a fragmentary vertical sectional view illustrating a further modification of a cell embodying the features of my invention.

Referring now to Figs. 1 and 2 of the drawing, the reference character 1 designates an extruded zinc cup the bottom wall of which is of substantially greater thickness than the side wall thereof. Arranged within the zinc cup is a mass of depolarizing mix 2 containing a suitable electrolyte, and a carbon electrode 3. The mix is enclosed within a lining 4 formed of paper or other suitable material and the upper end of the mix is covered by a paper washer 5 which surrounds the carbon electrode. The upper end of the zinc cup is deflected inwardly as shown at 6. A thin layer of insulating material 7 which may be formed of pliofilm or paper impregnated with asphalt extends over the upper edge of the cup. Pliofilm is hydrochlorinated rubber, that is, rubber to which hydrogen chloride has been added. It is a good insulator, strong and somewhat stretchable and tear resistant and impervious to gas and liquids and is not materially affected by hydrocarbons.

A layer of similar electrical insulating material 7 surrounds the zinc cup and extends over the upper and lower ends thereof, as shown in Fig. 2. Fitting over the carbon electrode is an imperforate metal cover 8 having a recessed portion 9 which receives the upper end of the carbon electrode therein. It will be noted that the imperforate metal cover extends entirely across the top of the zinc cup and closes the same and has a downturned peripheral flange thereon. Disposed over the metal cover 8 is a thin layer 10 of suitable insulating material which extends downwardly below the downturned flange on the cover 8.

The cell is enclosed within a tubular metal sheath 11 the opposite edges of which are deflected inwardly, as shown at 12 and 13. It will be noted that the metal sheath is insulated from both the metal closure and the zinc cup and that the metal closure is insulated from the upper edge of the zinc cup and the metal sheath by two layers of insulating material. The metal closure has electrical contact with the carbon electrode. The zinc cup is inserted into the metal sheath in the position shown in Fig. 2, and the upper end thereover is spun over inwardly so as to hold the metal closure in place under considerable pressure. The two layers of insulating material which are disposed on opposite sides of the metal cover 8 serve to thoroughly insulate the cover from the sheath and cup and to provide means for venting excessive pressure within the cell without, however, permitting the liquid contents of the cell to escape or the ingress of outside air into the cell.

In Figs. 3 and 4 there is disclosed a slightly modified form of my invention which is identical with that shown in Figs. 1 and 2 except that the layer of insulating material 7 is replaced by a layer of similar insulating material 7ª which extends over the top of the imperforate metal cover 8. The upper end of the zinc cup is also closed by a cup-shaped strip of insulating material 14 having downturned flanges 15 thereon which extend downwardly over the upper peripheral edge of the zinc cup. In other words, the outer layer of insulating material which surrounds the zinc cup extends over the top of the cover 8 and the additional layer of insulating material 14 serves to insulate the metal cover 8 from the peripheral edge of the zinc cup while the metal sheath is insulated from both the metal cover and the zinc cup by the layer of insulating material 7a. In all other respects, this form of the invention is identical with that shown in Figs. 1 and 2.

In Fig. 5 there is disclosed a further modification of my invention which is identical with that shown in Figs. 3 and 4 except that the layer of insulating material 7a is replaced by a layer of insulating material 7b which terminates just short of the inwardly deflected upper edge of the zinc cup. The metal cover 8 is insulated from the zinc cup by the layer of insulating material 14 having downturned flanges 15. Extending over the imperforate cover 8 is a somewhat cup-shaped layer of insulating material 16 which serves to insulate the metal cover from the metal sheath. The shouldered portion 9 of the metal cover projects through the insulating material 16. The several layers of electrical insulating material are preferably formed of paper impregnated with asphalt or other material which has the quality of permitting gas to escape therethrough under pressure but which will prevent the liquid contents of the cell from escaping therethrough. In other respects, this form of the invention is identical with that shown in Figs. 1 to 4 inclusive.

It will now be clear that I have provided a dry cell battery which will accomplish the objects of the invention as hereinbefore stated. It is to be understood that the embodiments of the invention herein disclosed are to be considered merely as illustrative and not in a limiting sense as various changes may be made in the shape and size of the several parts as well as in the materials used without departing from the spirit of my invention. The invention is therefore limited only in accordance with the scope of the appended claims.

The improved constructions herein disclosed provide a battery which will have an exceptionally long shelf life as well as an active life and in which the possibility of leakage of the liquid contents of the cell is practically eliminated or at least reduced to a minimum.

Having thus described my invention, what I claim is:

1. A dry cell comprising a zinc cup containing a mass of mix, an electrolyte and a carbon electrode, the upper end of said cup being deflected inwardly so as to provide an upstanding peripheral edge, a thin layer of insulating material extending about said zinc cup but leaving a portion of the bottom thereof exposed and overlapping the upper peripheral edge thereof, an imperforate metal cap disposed over said carbon electrode and having good electrical contact therewith and having a downturned peripheral flange extending over said peripheral edge, a metal sheath surrounding said cup and having its upper end deflected inwardly over said cap, a thin layer of insulating material insulating said sheath from said cap, the lower end of said sheath being deflected inwardly over the bottom peripheral edge of said cup but insulated therefrom, said metal cap being clamped between the peripheral edge of said cup and the inwardly deflected portion of the upper edge of said sheath.

2. A dry cell comprising a zinc cup containing a mass of depolarizing mix, an electrolyte and a carbon electrode, an imperforate metal closure disposed over said carbon electrode and extending entirely across said cup and provided with a depending peripheral flange, the upper portion of said cup being off-set inwardly and terminating in an upstanding peripheral edge, a sheath enclosing said cup and having its upper end deflected inwardly over and spaced from the edge of the cup, said cover lying in said space between the deflected end of the sheath and the said edge of the cup with the cover flange lying between the sheath and off-set portion of the cup, insulating material between the cover and the sheath and other insulating material between the cover and the upper off-set portion of the cup and extending over the upstanding peripheral edge of the cup between the cover and said edge whereby the cover is insulated both from the sheath and from the zinc cup.

3. A dry cell comprising a zinc cup containing a mass of depolarizing mix, an electrolyte and a carbon electrode, an imperforate metal closure disposed over said carbon electrode and extending entirely across said cup and provided with a depending peripheral flange, the upper portion of said cup being off-set inwardly and terminating in an upstanding peripheral edge, a sheath enclosing said cup and having its upper end deflected inwardly over and spaced from the edge of the cup, said cover lying in said space between the deflected end of the sheath and the said edge of the cup with the cover flange lying between the sheath and off-set portion of the cup, insulating material between the cover and the sheath and other insulating material between the cover and the upper off-set portion of the cup and extending over the upstanding peripheral edge of the cup between the cover and said edge whereby the cover is insulated both from the sheath and from the zinc cup, said layers of insulating material being formed of fibrous material impregnated with a material somewhat pervious to gas under pressure so as to relieve excessive pressure within the cell without permitting the liquid contents of the cell to escape.

CYRIL P. DEIBEL.